July 20, 1937.    J. M. CHRISTMAN    2,087,231
ROTARY CUTTING TOOL AND METHOD OF CUTTING
Filed March 13, 1936    2 Sheets-Sheet 1
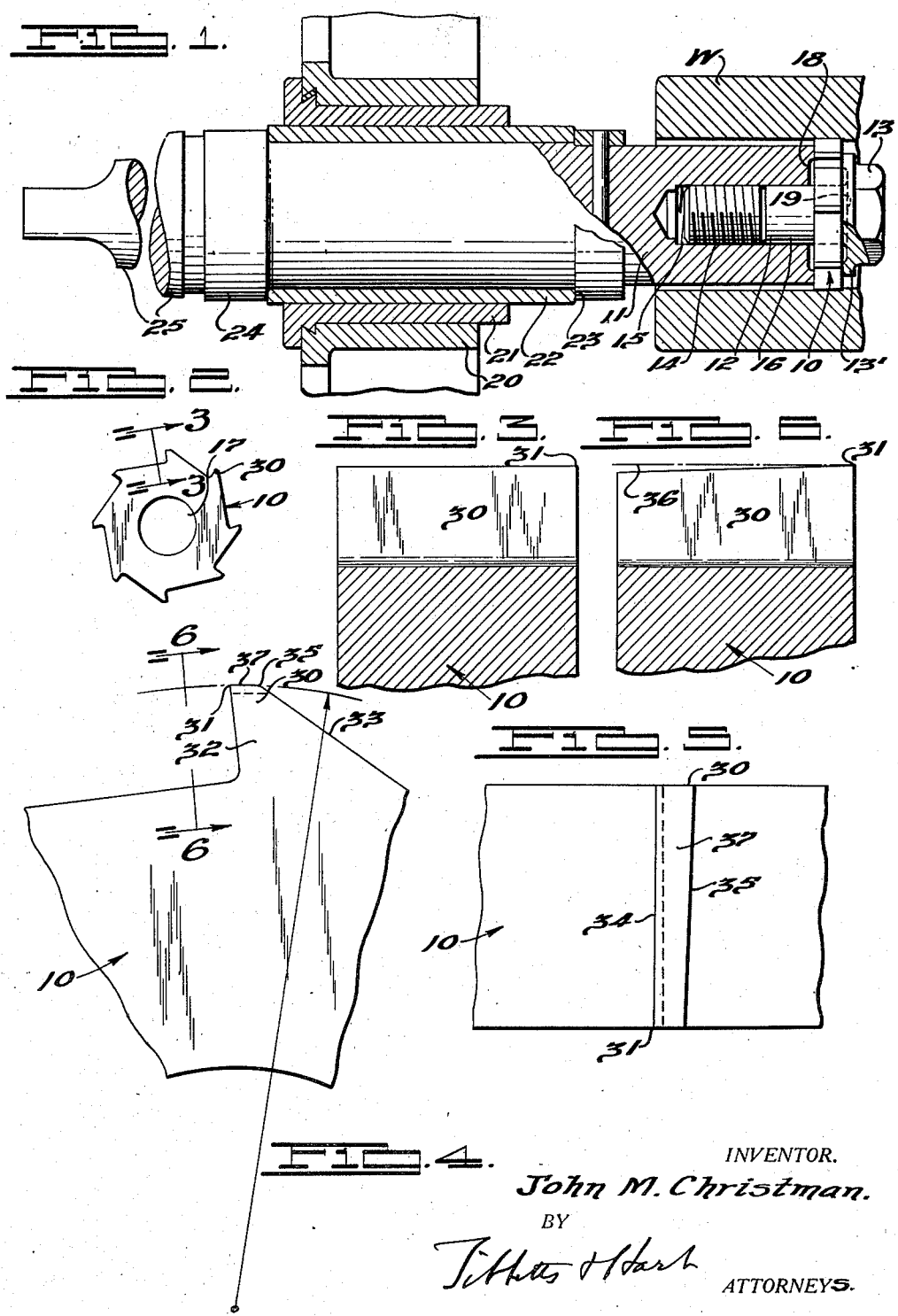
INVENTOR.
John M. Christman.
BY
ATTORNEYS.

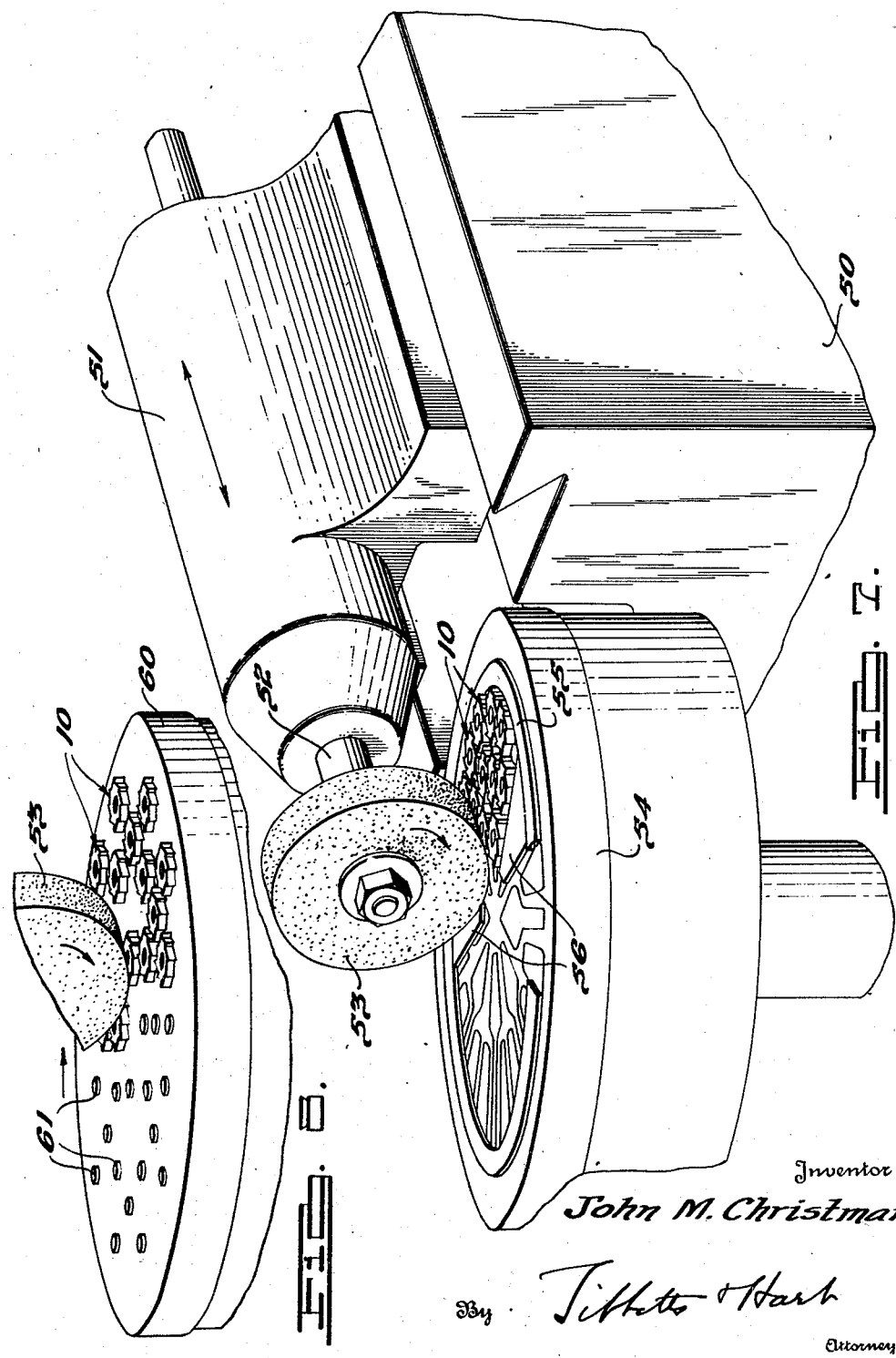

Patented July 20, 1937

2,087,231

UNITED STATES PATENT OFFICE 2,087,231

ROTARY CUTTING TOOL AND METHOD OF CUTTING

John M. Christman, Detroit, Mich., assignor to Packard Motor Car Company, Detroit, Mich., a corporation of Michigan Application March 13, 1936, Serial No. 68,589

18 Claims. (Cl. 77—58)

This invention relates to rotary cutting tools, the method of cutting, and to the method of forming and sharpening the cutters or cutting members.

Boring tools, such as reamers, usually comprise a body having longitudinally extending teeth at one end, the teeth having peripheral and end cutting edges, and a driving shank at the other end. In some instances these teeth are formed integral with the body of the tool and in others they are separately formed and are detachable from the body. In either type of tool it is customary to form the leading ends of the teeth by individual grinding, cutting the end away at a slight angle to form a relief for the cutting edge. Very accurate grinding is required if the tool is to run fairly true and this makes it a very costly operation.

So far as known, with machine reamers heretofore used, the peripheries have always been ground with some back taper, especially when reaming holes that are quite long, because if a cylindrical ground reamer of that type is used a tapered bore results due to the length of the cutting teeth and the impossibility of holding the reamer in absolute alignment during operation. But this back taper must be limited, and usually is limited, to about two-thousandths of an inch to the inch, as more taper, while desirable in operating on some kinds of material, would make the cost prohibitive due to the fact that each resharpening of the leading ends of the teeth moves the cutting points down on the taper and hence decreases the effective diameter of the tool, and consequently a few resharpenings would make the tool too small for the job and it would have to be discarded. And each of these resharpenings is a repetition of the costly individual grinding operation above referred to.

This individual grinding of the tooth ends and this necessity of discarding a partly used tool because of even this small taper, make the tool cost of reaming very high. If the tools are used too long without resharpening the ends a rough surface results, or if the tools are used after resharpening to too small a diameter the hole is too small, and in either of these cases an additional or finish reaming operation is required.

Also, tools made with the above referred to relief for the cutting ends of the teeth are operated with a light feeding force axially of the tool and this light pressure of the ends of the teeth against the work permits some deflection of the tool, particularly when there is variation in the hardness of different parts of the work, and this deflection cannot be entirely prevented by the tool guiding means, with the result that an oversize bore or a rough surface is produced instead of the desired accurate smooth surface within the bore.

One of the objects of the present invention is to provide a rotary cutting tool that will produce a smoother surface, particularly when taking a heavy cut, than is possible with previous similar tools.

Another object of the invention is to provide a rotary cutting tool that will produce a more nearly accurate cylindrical bore than is possible with previous boring tools.

Another object of the invention is to provide a boring tool that is cheaper to make and to resharpen and which therefore may be used in a more nearly sharp condition than previous similar tools without increasing the tool cost.

Another object of the invention is to provide a cutter for a boring tool which cutter, without any back taper axially of the tool, will produce a smooth cylindrical bore, or which, when formed with a greater back taper than can be profitably employed on conventional reamers, will produce better work than conventional reamers and at a greatly reduced tool cost.

Another object of the invention is to provide a cutter for a boring tool having tooth cutting corners that will take a large chip and at the same time produce a smooth cut surface to accurate size.

Another object of the invention is to provide a better operating boring tool having end cutting edges formed without relief.

Another object of the invention is to provide a boring tool cutting member of disk form without axial taper for making fast cuts on certain kinds of material at a low tool cost.

Another object of the invention is to provide a boring tool cutting member of disk form with a greater axial taper than has heretofore been practicable, for use on certain kinds of material, at a low tool cost.

Another object of the invention is to materially reduce the cost of boring or reaming by providing a cutter having tooth end cutting edges all of which can be sharpened by a single grinding operation.

Another object of the invention is to provide a boring tool cutter with its tooth end cutting edges so formed that a number of such cutters can be held and said cutting edges sharpened or resharpened by a surface grinding operation.

Another object of the invention is to reduce the present initial sharpening and the resharpening costs of reamers by providing a disk boring cutter which can be ground across one or both sides to sharpen the cutting edges.

Another object of the invention is to provide a metal working tool, of the reamer type, having an integral replaceable boring member capable of removing the same amount of metal as, or more metal than, a conventional reamer and formed so that many of such members can be constructed and maintained for no greater cost than a single conventional reamer.

Another object of the invention is to provide a method of boring a metal work piece to produce an accurate bore and smooth surface.

Another object of the invention is to provide a method of forming the cutting members of boring tools at a low cost.

Another object of the invention is to provide a low cost method of resharpening the cutting edges of the ends of the teeth of boring tools by finishing a plurality of tools by a single surface grinding operation.

Other objects of the invention will appear from the following description taken in connection with the drawings, which form a part of this specification, and in which:

Fig. 1 is a view, partly in section, of a boring tool constructed in accordance with my invention and in boring relation with a piece of work;

Fig. 2 is a side view of the cutter or cutting member of the tool shown in Fig. 1;

Fig. 3 is a very much enlarged section on the line 3—3 of Fig. 2, showing the cutter with no back taper;

Fig. 4 is a very much enlarged view of the end of one of the cutting teeth of a cutter similar to that of Fig. 2, except that this cutter is ground with back taper;

Fig. 5 is an edge view of the cutter tooth of Fig. 4, to the same scale, and particularly showing the top or land of the tooth;

Fig. 6 is a section on the line 6—6 of Fig. 4, showing the back taper of the periphery of the cutter;

Fig. 7 is a perspective view showing the principal operating parts of a grinding machine for sharpening the end cutting edges of the boring tool cutters of this invention; and Fig. 8 shows another form of holding table for the grinding machine of Fig. 7.

Referring to the drawings, the cutter or cutting member of the boring tool is indicated generally at 10 and it is mounted upon a bar or support 11 as by a bolt 12, the bolt having a hex head 13 in contact with the cutter and a threaded portion 14 screwed into the threaded portion 15 of the support. The bolt 12 also has a smooth cylindrical portion 16 fitting closely in a similar portion of the support and extending through a cylindrical opening 17 in the boring member 10. The bar or support 11 immediately back of the cutter 10 extends well out on the teeth of the cutter to give them support and to get as large a radius of contact with the cutter as possible for driving the cutter without keying thereto. To insure full surface contact near its periphery the end face of the bar is relieved slightly as shown at 18. For the same purpose the bolt head 13 is undercut as at 19, and in order that clearance may be provided for the chips, which curl forward with this cutter and in smaller coils, the bolt head 13 is smaller in diameter at its flange 13' than is the bar 11 on the other side of the cutter, and still smaller at the hex portion.

With this construction it will be seen that not only is the cutter 10 centered upon and adapted to be secured to the support, but if the bolt 12 is not originally tightened to the required degree the first cutting operation of the tool will cause the bolt to thread into the bar and automatically tighten the cutter on its support. With this construction the disk cutter is equally clamped at all points, it is more easily applied to the support than would be the case if a key or spline were used, and since no keyway is formed in the cutter and the cylindrical opening 17 and the spaces between the teeth are the only cutaway parts of the disk, the latter will not go out of round and will not be weakened by unequal or notched body form. Also the cost is less.

The work upon which the boring tool is operating is indicated at W and the tool is shown as reaming out the hole that has already been formed in the work.

A carrier 20 is provided for the support 11 and this carrier has a sleeve 21 in which is slidingly telescoped a sleeve 22 on the support 11. A pinned collar 23 retains the sleeve 22 on the support 11 against a shoulder 24. The support or bar 11 is formed at its opposite end with a driving shank 25 by which it may be rotated and moved endwise into and through the work.

The cutter or cutting member 10 is in the form of a disk which is of a width about one-fifth or one-sixth its diameter. It may be even thinner than this, depending largely upon how it is to be made, that is, whether by stamping it out of sheet metal or by forming it from a bar. The cutters may be made by boring a metal bar, cutting or rolling the teeth on the bar, and then cutting the individual disks from the bar. If the teeth of the cutter are to be formed in the disk after stamping or cutting, several of them may be mounted together on a bar and the teeth of all cut at one time. The teeth may be evenly spaced, or a slight unevenness may be effected, to prevent chatter.

The shape of the teeth of this disk-like cutter is best illustrated in Figs. 2, 3, 4, 5, and 6. In Figs. 3, 4, 5, and 6, the teeth are greatly enlarged, being shown approximately eight times the size of those of Fig. 2. The teeth extend across the peripheral face of the disk and they may be formed parallel to the axis of the disk, or approximately so, or they may be spiraled. In Fig. 3 the periphery of the disk is shown as formed cylindrical or with no back taper, while in Figs. 4, 5, and 6 a back taper form is shown. The no-taper form is found desirable for some kinds of material, such as certain steels, while the back taper form is used for some other materials, such as bronze.

It costs less to grind cylindrical than tapered; hence there is a saving in using these disk cutters with no back taper. Because of the short teeth in contact with the work they may be used without back taper on some materials that require back taper when a conventional reamer is used. Or if a taper must be used to get good results, which is true with certain materials operated upon, a greater taper can be given these cutters for greater accuracy, at less cost than conventional reamers, because the disk cutters are so cheaply made they may be discarded after only a few resharpenings.

The cutter tooth is indicated at 30. Its cutting corner is marked 31 and it is the formation of this corner and adjacent parts of the tooth that is of importance in this boring tool. In previous tools the leading end of each tooth is cut at an angle or relieved immediately back from the cutting edge, and this of course requires individual grinding of each tooth end. It is almost impossible, if not impossible, to so grind that these cutting edges will be exactly in a plane normal to the axis of the tool, and if they are not there is bound to be a cocking of the tool in its operation and a resulting inaccurate bore. Also, with the relieved form of tooth end, when the cutting tool is pressed forward into the work there is a line contact of the forward cutting edge of the tooth with the work, and slight pressure on the tool causes the cutting edge to dig in. This "digging-in" upsets the accuracy of the operation and a rough or inaccurate surface is produced, particularly when there are relatively soft spots in the work. In the present invention the front, or leading, end of the tooth is ground normal to the axis of the disk and the front end of every tooth of the tool is in this plane, so that the cutting end of every tooth presses equally against the work, not with a line contact, but with a surface contact, and greater pressure than in other tools may be used to force the tool into the work without causing it to "dig-in." Thus the entire surface 32 of the front end of the tooth 30 is ground in a plane normal to the axis of the disk and this permits of a single surface grinding operation for all of the teeth, as will be hereinafter more fully described.

But this "surface contact" of the end of the tooth with the work is not over a considerable area. It extends only a little more than the length of the land from the leading cutting edge of the tooth. Thus, as shown in Fig. 4, the back of the tooth is cut away as at 33, leaving the land 37, so that the contacting part of the end of the tooth extends, in the small cutter shown in Fig. 2, about a thirty-second of an inch. But with this construction the tool performs very differently from cutters having relieved end faces.

The land 37, that is, the cylindrical or arcuate top of the tooth, from its forward cutting edge 34 is at every point in its length circular in cross-section, in that these lands are ground while rotating on the disk axis. This top surface extends from the cutting edge 34 to the apex 35 of the angle formed by the cutaway back 33 of the tooth. In Fig. 5 the lines 34 and 35 define this surface or land 37, and since the tool in this showing is ground with a back taper the lines 34 and 35 recede slightly. In other words, the peripheral face of the disk is ground on a taper such that the diameter of the front, or leading, face of the disk is slightly greater than is the diameter of the rear face of the disk. This "back taper" is usual in reamers, but ordinarily not more than two-thousandths of an inch per inch is used, because if more taper is used the reamer soon becomes useless, due to the fact that the leading edge, being ground away in sharpening, becomes of lesser diameter and therefore cuts a smaller bore. But on some materials better results are obtained with a greater taper and in the present cutting disk a taper of eight to twelve-thousandths of an inch per inch may be used. This taper is indicated by the dot-and-dash line 36 in Fig. 6, and the angle of the lines 34 and 35 in Fig. 5 indicates the taper in that figure.

From this description it will be seen that the cutting corner 31 of each tooth of the cutting disk is formed by a flat surface normal to the axial path of feed of the tool and a cylindrical or substantially cylindrical surface parallel to or coincident with the rotary path of travel of the periphery of the tool, and this flat surface or flat end presses, simultaneously with the flat ends of the other teeth, into the metal surrounding the opening in the metal work piece and compresses a substantial area of the same. Another way of describing the formation of the cutting ends of the teeth is to say that they are conjugate to a figure formed by a line extending radially from and rotated about the axis of the disk, and this line may be normal to the axis of the disk or it may radiate therefrom at an angle to the normal, and it may be straight or it may be a curved line.

In connection with Figs. 7 and 8 a machine and method for surface grinding the cutters or cutting members will be described. In Fig. 7, the base of the machine is indicated at 50 and upon this is a slide 51 having bearings for a shaft 52 on the outer end of which is a grinding wheel 53. Under the grinding wheel is a magnetic chuck 54 rotatably mounted so that various parts of its surface may be presented to the grinding wheel 53. A ring 55 and filler plates 56 assist in positioning the work on the chuck. The various parts of the machine are suitably operated to bring all of the work on the chuck into contact with the rotating grinding wheel, the mechanism for this purpose not being shown.

Mounted upon the chuck 54 are a number of the cutters or cutting members 10 of this invention. With the cutting members on the chuck as shown the chuck is slowly rotated and the grinding wheel is operated in contact with the cutters, the grinding wheel also moving axially to operate on all of the cutters on the chuck. Usually the cutters are turned over for a second operation on the other sides so that the sides will be absolutely parallel.

Another form of chuck is illustrated in Fig. 8. In this form the chuck 60 is provided with a plurality of bosses or pegs 61 upon which the cutters 10 may be mounted. Thus the cutters will be held in position as they are passed under the grinding wheel for the sharpening operation on the ends of the teeth.

After the ends of the cutter teeth have thus been sharpened the next operation is to grind the hole in the disk to the desired size and to bring its axis into the exact normal to the ground faces. This hole-finishing operation can be done on the cutting disks individually or a plurality of them can be held in alignment for finishing several at a single grinding operation.

The next operation is to grind the periphery of the cutter so that the lands of the teeth are exactly formed as hereinabove described. This operation, also, can be done on the disks individually or on several at a time.

For resharpening the ends of the teeth after the cutter has been used it is only necessary to drop several of them on the chuck and grind the cutting face, this being a very simple and inexpensive operation.

It will thus be seen that this invention provides low-cost boring or reaming and produces a finished surface on the work which is relatively smooth. The cutters herein described can be formed and can be resharpened for a cost much less than the corresponding costs of reamers now used. Many of these boring tools have been made and successfully operated and it is found that the work performed by them is better than with conventional reamers and the costs of making and resharpening the cutters are low.

It will be understood that various forms of the invention other than those described above may be used without departing from the spirit or scope of the invention.

What I claim is:

1. A rotary boring cutter comprising a metal disk having peripheral teeth extending axially thereof, the ends of the teeth at and inward of their peripheries being flat and in the same plane, the intersecting surfaces of the ends and sides of the teeth forming cutting edges in a plane normal to the axis of the disk, and the periphery of the teeth being formed cylindrical without back taper from the cutting ends of the teeth.

2. A rotary boring cutter comprising a substantially cylindrical disk having teeth formed across its peripheral face, the cutting ends of said teeth on one side of the disk being disposed in a plane normal to the cutter axis and formed without relief.

3. A rotary boring tool comprising a cutter in the form of a circular disk having teeth with peripheral and end cutting edges, the cutting ends of said teeth on one side of the disk being disposed in a plane normal to the cutter axis and formed without relief, said disk having a central cylindrical opening, a supporting bar therefor having its end in contact with one side of said disk well out towards the periphery of the teeth, means centering the disk on the bar, and means supporting the opposite side of the disk and securing it to the bar.

4. A rotary boring tool comprising a cutter in the form of a circular disk having teeth with peripheral and end cutting edges, the cutting ends of said teeth on one side of the disk being disposed in a plane normal to the cutter axis and formed without relief, said disk having a central cylindrical opening, a supporting bar therefor having its end in contact with one side of said disk said contact extending beyond the circular base of the teeth and means in contact with the other side of said disk and connected to said bar for clamping the disk on the end of the bar and causing it to turn therewith solely by frictional contact.

5. A rotary boring cutter comprising a substantially cylindrical disk having teeth formed across its peripheral face, the cutting ends of said teeth on one side of the disk being formed by a surface which if similarly continued across the spaces between the teeth would form a continuous surface of revolution symmetrical with respect to the axis of the cutter.

6. A rotary boring cutter comprising a circular disk having its periphery tapered about twelve-thousandths of an inch to the inch from one side of the disk to the other, said disk having teeth extending across its tapered face in the general direction of the taper, said teeth having flat cutting ends at the larger diameter side of the disk disposed in a common plane normal to the disk axis and having cutting edges formed by the intersection of such flat cutting ends with the forward faces of the teeth.

7. A rotary boring cutter comprising a disk having teeth formed substantially axially across its peripheral face, the tops of the teeth being formed with a back taper from their cutting ends, said taper being more than eight-thousandths of an inch to the inch, said teeth having flat cutting ends at the larger diameter side of the disk disposed in a common plane normal to the disk axis and having cutting edges formed by the intersection of such flat cutting ends with the forward faces of the teeth.

8. A rotary boring cutter comprising a substantially cylindrical disk having teeth formed across its peripheral face, the cutting ends of said teeth on one side of the disk being in a common plane normal to the disk axis, the cutting corner of each tooth thus being formed by three intersecting surfaces, (a) the surface forming the leading face of the tooth, (b) the flat surface normal to the axial feed of the cutter and (c) the cylindrical surface parallel to or coincident with the rotary path of travel of the periphery of the cutter.

9. A rotary boring cutter comprising a holder in the form of a mandrel only slightly smaller than the hole to be cut, a disk that is thin relative to its diameter, said disk having teeth around its circumference, means securing the disk to the end of the mandrel with the teeth extending beyond the periphery thereof, and with the disk against the end face of the mandrel adjacent the periphery of the latter, all the teeth of the disk extending continuously across the peripheral face of the disk and having flat leading ends in the same plane so that these leading ends may have simultaneous surface contact with the work operated upon.

10. A rotary boring tool comprising a flat circular metal disk having parallel faces and having its periphery formed by alternate teeth and flutes, the leading end of each of said teeth being a flat surface coplanar with the corresponding face of said disk, and each said leading end having a substantially radially extending cutting edge constituted by the intersection of said flat end surface and the wall of the adjacent flute, whereby all of said edges are in a single plane.

11. A rotary boring tool comprising a disk having flutes forming teeth spaced about the periphery of the disk and provided at their leading ends with flat surfaces and substantially radially extending cutting edges, said edges being formed by the intersection of the surfaces of said flutes and tooth ends, said surfaces and edges being coplanar with the face of the disk, so that said flat surfaces and said edges may equally and simultaneously contact the work to be operated upon.

12. A rotary cutting tool for finishing a cylindrical surface to the effective diameter of the tool by relative axial displacement of the tool and work, comprising a disk having an opening therethrough, thereby providing internal and external surfaces, one of said surfaces having flutes forming teeth spaced thereabout, said teeth provided at their leading ends with flat surfaces and substantially radially extending cutting edges, said edges being formed by the intersection of the surfaces of said flutes and tooth ends, said flat surfaces and edges being coplanar with the face of the disk, so that said flat surfaces and said edges may equally and simultaneously contact the work to be operated upon.

13. A rotary boring cutter comprising a metal disk having peripheral teeth extending axially thereof, the ends of the teeth adjacent their peripheries being flat and in the same plane, said flat ends intersecting the forward faces of the teeth to form cutting edges, and the top of each tooth forming a cylindrical land of small extent circumferentially.

14. A rotary boring tool comprising a flat circular metal disk having parallel faces and having its periphery formed by alternate teeth and flutes, the leading end of each of said teeth being a flat surface coplanar with the leading end of every other tooth of the disk, said flat ends intersecting the forward faces of the teeth to form cutting edges, the top of each of said teeth forming a cylindrical land of small extent circumferentially, said lands being on arcs about the axis of the disk.

15. A rotary boring tool comprising a flat circular metal disk having parallel faces and having its periphery formed by alternate teeth and flutes, the leading end of each of said teeth being a flat surface coplanar with the leading end of every other tooth of the disk, and each said leading end having a substantially radially extending cutting edge constituted by the intersection of said flat end surface and the wall of the adjacent flute, whereby all of said cutting edges are in a single plane.

16. The method of boring a metal workpiece having a cylindrical opening consisting in rotating a flat, multiple toothed cutting disk upon its central axis, moving the disk along its axis relatively to the workpiece, substantially coaxially with the opening, pressing substantial portions of the flat ends of the teeth into the metal surrounding the opening and compressing substantial areas of the same whereby the cutting edges lying in the forward faces of the teeth are enabled to uniformly and continuously remove chips to thereby enlarge and accurately finish the bore of the opening.

17. The method of boring a metal workpiece having a cylindrical opening which comprises feeding into the opening a multiple toothed cutter having a radius larger than the opening by the thickness of material to be removed, causing the cutting edge of each tooth to remove metal along a helical surface radial to the axis and to a depth determined by the rate of feed and causing the end face of each tooth at the rear of its cutting edge to compress the metal to an extent proportioned to the rate of feed, the degree of compression increasing substantially linearly from the cutting edge to the rear of the tooth.

18. A rotary boring cutter comprising a metal disk having peripheral teeth extending longitudinally of the axis, said disk having on its leading end a surface wholly in one plane to form with the tooth walls, cutting edges at the junction with one side of each of said teeth.

JOHN M. CHRISTMAN.